United States Patent [19]
Duer

[11] 3,814,528
[45] June 4, 1974

[54] SHAFT AND ARM ASSEMBLY

[75] Inventor: Morris J. Duer, Lansing, Mich.

[73] Assignee: General Motors Corporation, Detroit, Mich.

[22] Filed: Sept. 5, 1972

[21] Appl. No.: 286,317

[52] U.S. Cl. ............................................. 403/256
[51] Int. Cl. ............................................. F16d 1/03
[58] Field of Search ........... 403/234, 378, 379, 373, 403/374, 375, 213, 256, 235

[56] References Cited
UNITED STATES PATENTS

| | | | |
|---|---|---|---|
| 863,687 | 8/1907 | Abbott | 403/256 |
| 1,510,501 | 10/1924 | Ross | 403/256 |
| 1,731,759 | 10/1929 | Winterfeld | 403/373 |
| 1,742,689 | 1/1930 | Chandler | 403/235 |
| 1,757,412 | 5/1930 | Collins | 403/256 |
| 1,911,459 | 5/1933 | Mitchell | 403/234 X |

*Primary Examiner*—Alfred R. Guest
*Attorney, Agent, or Firm*—Paul Fitzpatrick

[57] ABSTRACT

A shaft and arm assembly comprising a shaft with two flats forming a convex angle and a transverse groove on the side of the shaft opposite the apex of the angle, an arm formed from a strip of material bent back on itself to form two parallel members and a curved end with an opening that extends into each member as a notch and a slot, the sides of the notch fitting against the flats of the shaft, a bolt extending inside the bent end of the arm along the groove in the shaft and a nut on the bolt which, when tightened, causes the sides of the notches to be pinched together against the flats to draw themselves and the bolt tightly into fixed angular position against the shaft.

1 Claim, 4 Drawing Figures

PATENTED JUN 4 1974 3,814,528

SHAFT AND ARM ASSEMBLY

SUMMARY OF THE INVENTION

A great number of mechanical devices exist which are actuated by rotating a shaft. The torque necessary to rotate the shaft is supplied through an arm attached to the shaft for rotation of the shaft. One type of device in which the attachment of the arm to the shaft presents some particular difficulty is a rotary valve. In such a valve, a large amount of torque may be required to overcome the friction caused by the relative movement of surfaces held tightly together for sealing purposes; but any angular slipping of the arm relative to the shaft may cause the valve to malfunction, since its internal passages will no longer line up correctly relative to the angular position of the arm.

My invention is an attached shaft and arm assembly which is simple and inexpensive to manufacture, self-indexing in its assembly, and able to withstand a large torque without slipping in operation. The arm is a simple stamped part; and the shaft can be cast, either by itself or integrally with the member that it actuates. Neither the shaft nor the arm requires machining of any kind; nor do they require closely held tolerances. Since the shaft and the engaging portion of the arm are uniquely shaped in cross section, the indexing of the shaft and arm are accomplished once in the design state; and the arm is automatically angularly aligned with the shaft during assembly. The use of three flat surfaces in a generally triangular arrangement between the shaft and the arm produces great resistance to angular slippage due to torque without requiring expensive splines or teeth.

Details and further advantages of my invention can be seen in the accompanying drawing and the following description.

DESCRIPTION OF THE PREFERRED EMBODIMENT

Figure 1:
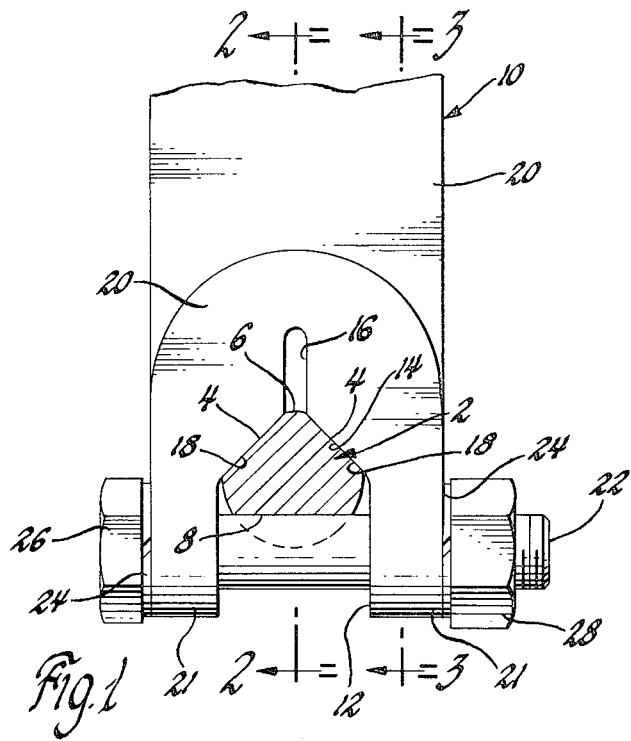
FIG. 1 shows the preferred embodiment of my invention viewed along the axis of the shaft with the shaft cut away.
Figure 4:
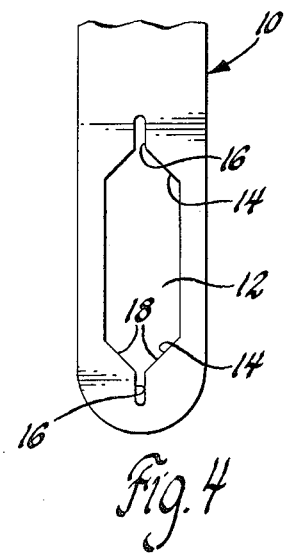
FIG. 4 shows the arm flattened out.
Figure 3:
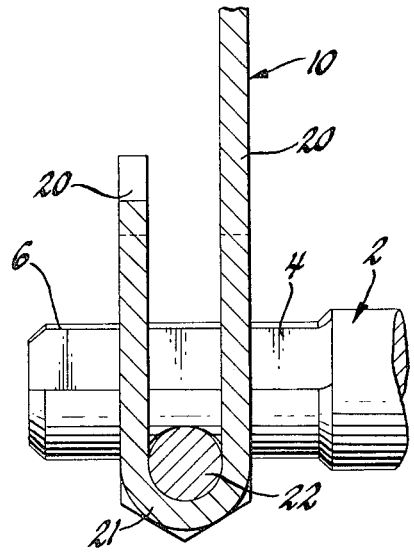
FIG. 3 is a view along line 3—3 in FIG. 1.

A shaft 2 has two flats 4 forming planes parallel to the axis of the shaft and meeting in an apex 6 to form a convex angle. On the side of the shaft opposite the apex 6 is a transverse groove 8. An arm 10 is stamped from a strip of metal, as shown in FIG. 4, so as to contain an opening 12 which forms, at each of its ends, a notch 14 and a slot 16. The arm 10 is bent 180° back on itself as shown in FIG. 3 to form two substantially parallel straps 20 joined by an attaching portion consisting of two U-shaped extensions 21, with the notches 14 and slots 16 aligned so that the opening 12 is in the end of the arm as shown in FIG. 1. Also, as seen in FIG. 1, the sides 18 of notch 14 form substantially the same angle with each other as do the flats 4 of the shaft 2.

Figure 2:
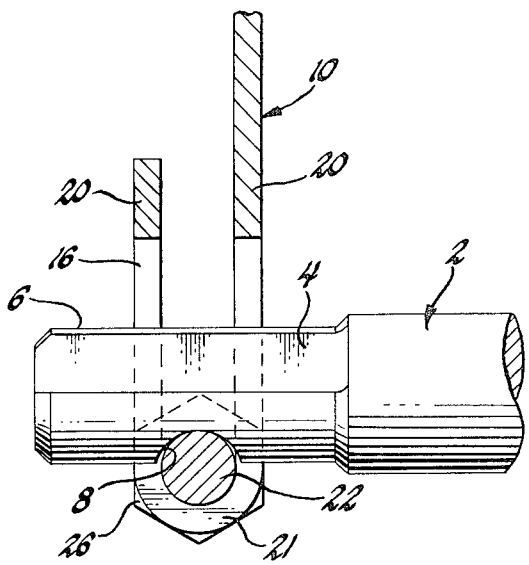
FIG. 2 is a view along line 2—2 in FIG. 1.

The arm 10 is mounted on the shaft 2 so that the sides 18 of the notches 14 engage the flats 4 of the shaft 2, as seen in FIG. 1; and the space between the two straps or sides 20 of the arm 10 is aligned with the groove 8, as shown in FIG. 2. A tensioning fastener such as bolt 22 is inserted between the arm 10 and the groove 8 with washers 24 outside the arm on each side. A head 26 on the bolt 22 and a nut 28 threaded on the bolt 22 are positioned outside one of the washers 24.

As the nut 28 and bolt 22 are tightened relative to one another, equal opposing forces are exerted on the U-shaped extensions 21 of the arm 10, these forces tending to pinch the U-shaped extensions 21 together along the axis of the bolt 22. As the U-shaped extensions 21 of arm 10 are pinched together, the slots 16 allow the sides 18 of the notches 14 to also be pinched together. This movement is obliquely opposed by the flats 4 of the shaft 2, and the resultant forces exerted on the arm 10 and shaft 2 by each other cause the curved extensions 21 of the arm 10 and the groove 8 of the shaft 2 to be pulled toward each other and clamp down on the bolt 22. Thus the arm 10, bolt 20 and shaft 2 are held tightly together. Since the flats 4 and groove 8 of the shaft 2, when viewed in cross section as in FIG. 1, form a triangle, the arm 10 will be automatically aligned with the shaft 2 upon assembly; and the arm 10 will not slip angularly relative to the shaft 2 unless the relative torque becomes great enough to permanently deform one of the parts. The parts can be made of metal strong enough to resist any forces expected in the normal use of the assembly.

The preceding description should be considered preferred embodiment among other possible embodiments that will occur to those skilled in the art.

What is claimed is:

1. A shaft and arm assembly comprising, in combination:

a shaft having two flats extending generally parallel to the shaft axis adjacent to each other and defining a convex dihedral angle, the shaft also having a groove extending transversely to the shaft axis on the side of the shaft opposite the flats;

an arm defined by a strap with a return bend providing an attaching portion of U configuration with the sides of the attaching portion generally parallel and mutually spaced, the arm extending from one side of the attaching portion, the attaching portion having a notch splitting the return bend and extending into each side of the attaching portion from the return bend, the notch converging at substantially the dihedral angle of the flats and terminating in a narrow slot extending from the converging portion;

the shaft extending across the attaching portion of the arm with the converging portions of the notch bearing against the flats;

and a tensioning fastener extending through the return bend and lying within the groove to locate the arm axially of the shaft, the tensioning fastener acting to close the notch and forcibly secure the arm to the shaft.

* * * * *